S. B. HAZARD.
TRUCK FOR AGRICULTURAL IMPLEMENTS.
APPLICATION FILED JAN. 23, 1909.
1,059,362.
Patented Apr. 22, 1913.
3 SHEETS—SHEET 1.
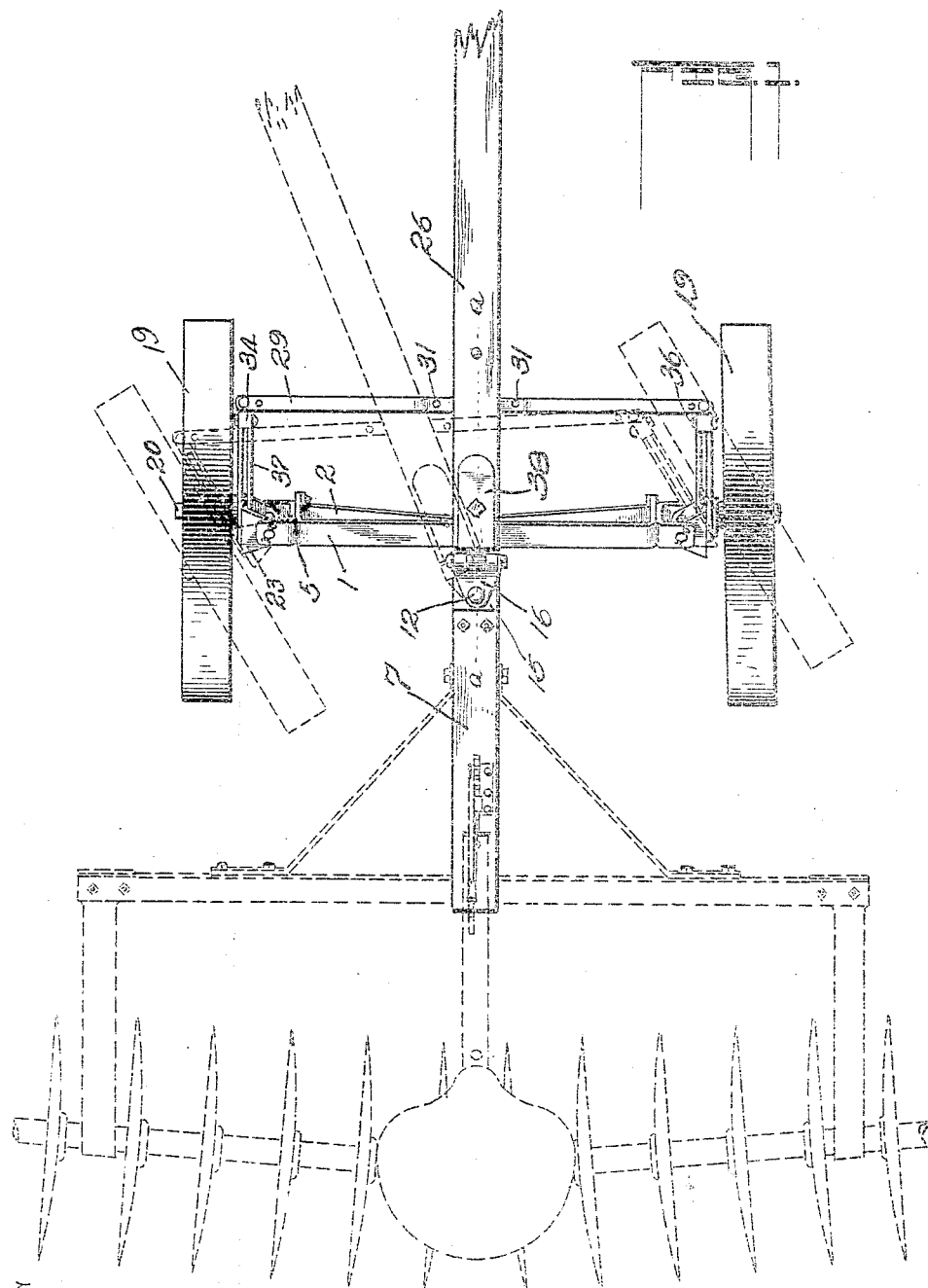

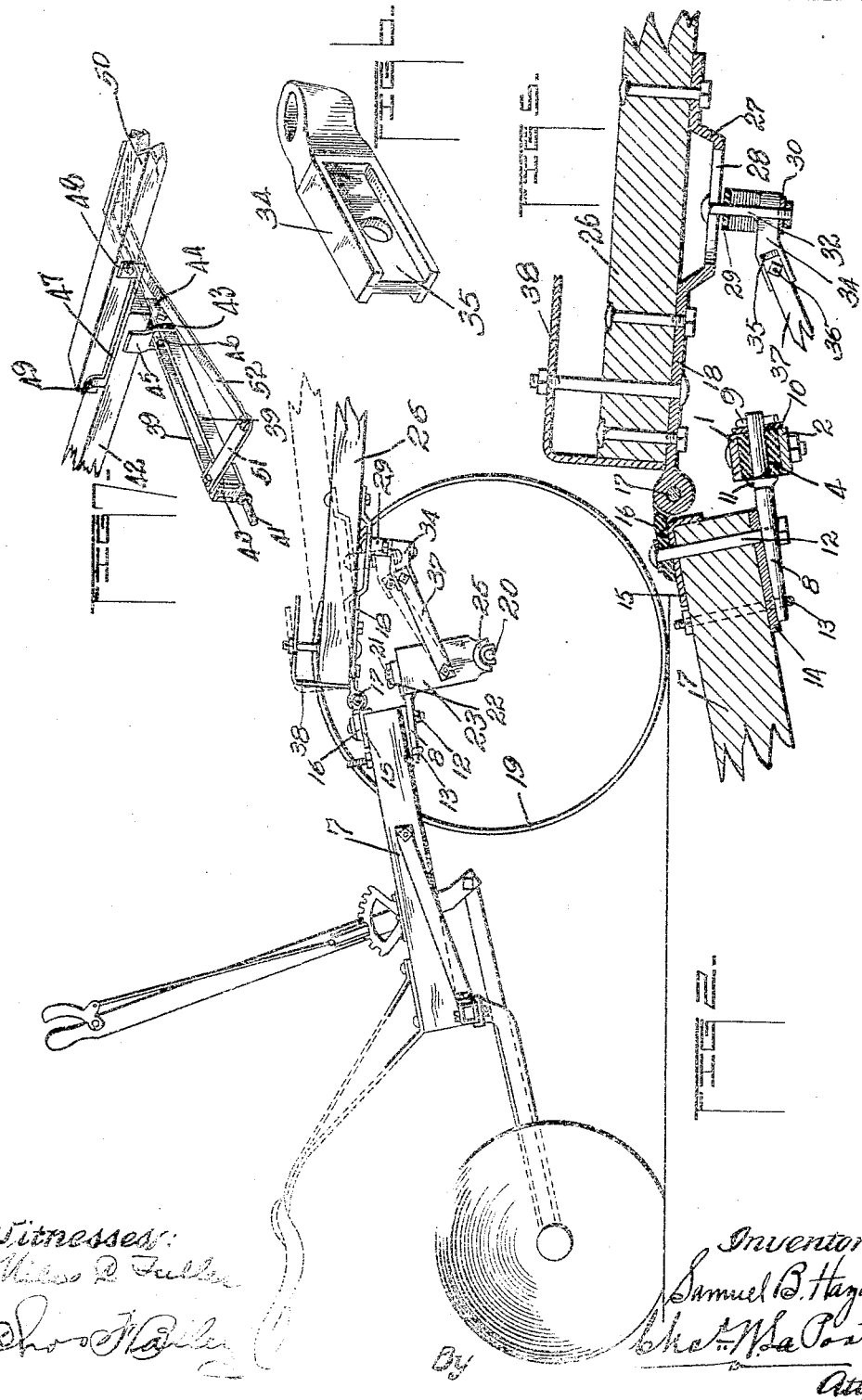

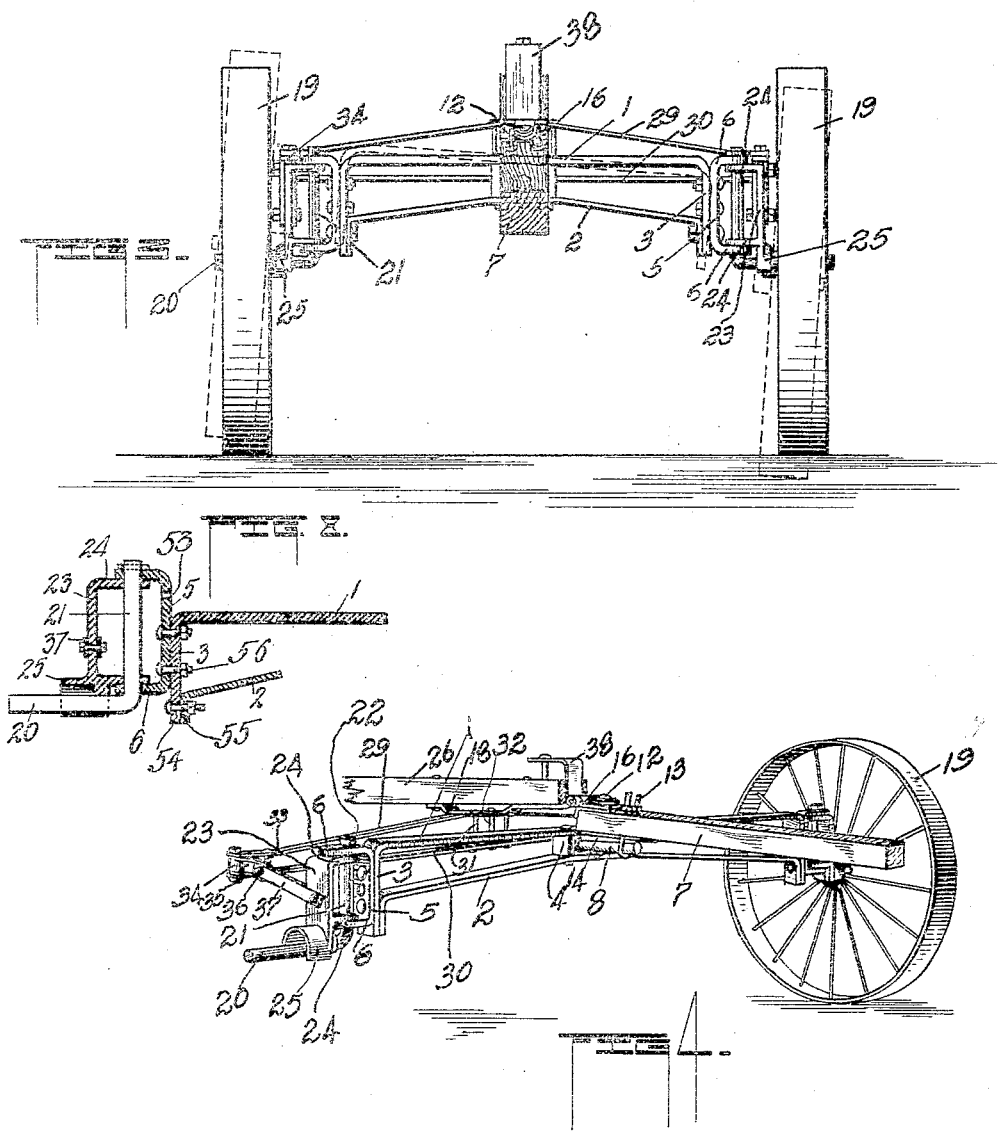

UNITED STATES PATENT OFFICE.

SAMUEL B. HAZARD, OF PEORIA, ILLINOIS.

TRUCK FOR AGRICULTURAL IMPLEMENTS.

1,059,362.  Specification of Letters Patent.  Patented Apr. 22, 1913.

Application filed January 23, 1908. Serial No. 412,329.

*To all whom it may concern:*

Be it known that I, SAMUEL B. HAZARD, a citizen of the United States, residing at Peoria, in the county of Peoria and State of Illinois, have invented certain new and useful Improvements in Trucks for Agricultural Implements; and I do hereby declare that the following is a full, clear, and exact description of the invention, which will enable others skilled in the art to which it appertains to make and use the same.

This invention has reference to trucks for use more particularly in connection with agricultural implements, and has for its object to provide a tongue-truck for use in connection with disk-harrows, although the truck is of such a nature that it may be used with other and different forms of agricultural tools or machines.

The invention has for a further object, a tongue-truck, including both a tongue adapted for connection with a farm implement or tool, a second tongue having a hinged connection with said first mentioned tongue, and with which double and swingletrees may be attached; an axle having an oscillatory connection with said first mentioned tongue, wheel supports having a swiveled connection with said axle, and steering connections between said second tongue and said wheel supports.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which—

Figure 1 is a greatly reduced top plan view of my improved tongue truck, dotted lines indicating a position of the wheels when the forward tongue is swung, and dotted lines showing also a disk-harrow connected with said truck; Fig. 2 is a side elevation of my improved truck with the disk-harrow attached thereto, and shown in full lines; while by dotted lines the front tongue is shown in a raised position; Fig. 3 is an elevation looking at the rear of my improved truck, and in dotted lines the axle and wheels are shown in a tilted position to illustrate how the axle may rock in a vertical plane; Fig. 4 is a perspective view looking at my improved truck from the rear and to one side; the near wheel having been removed; Fig. 5 is an enlarged vertical longitudinal sectional view as the same would appear if taken on the line *a—a* of Fig. 1; Fig. 6 is a detail perspective of a connection in the steering mechanism; Fig. 7 is a perspective showing a modified construction of a front truck, and Fig. 8 is a detail sectional view illustrating how the body of the axle may be adjusted, by being elevated or lowered and maintained in such position.

Like numerals of reference indicate corresponding parts throughout the figures.

No attempt has been made to illustrate in detail, the particular form of disk harrow in connection with which it is designed to use my improvements, nor is it thought necessary to refer particularly to the detail construction and coöperation of the component parts of a disk-harrow, as no particular claim will be made on the detail construction of such a harrow, except in so far as the harrow or parts thereof, coöperate or are combined with my improvements. As was intimated in the fore part of the specification, it is designed to employ my improvements in connection, preferably with a disk-harrow, although it will be obvious that in connection with any agricultural implement where it is designed to employ a tongue truck, my improvements may be applied equally as well, as to a disk-harrow.

In the drawings, the axle is constructed preferably in truss like form, being composed of upper and lower bars 1 and 2, the former having its opposite ends bent downwardly as at 3, while the body of the latter diverges downwardly from a central point where it is connected to the bar 1 through a bearing block 4 and the opposite ends of said bar 2 are also bent downwardly and secured to the portions 3 of bar 1, by being bolted or otherwise secured thereto; and secured to the portions 3 of the bar 1 are brackets 5, preferably U shaped, providing the upper and lower laterally projecting bearing plates 6 for a purpose to be explained.

The axle just described, has connected thereto and extending rearwardly therefrom, a tongue 7; the connection between tongue 7 and axle, being made through a spindle 8, the forward end of which has a bearing in the block 4, mounted between the bars 1 and 2 of the axle; and the relative position of the spindle, and the bearing block is maintained, preferably, by inserting a cotter-pin 9 through the forward end of the spindle, after first placing a washer 10 on the spindle, and a shoulder 11, against which the inner face of the block 4 will bear. With such a construction, it will be seen that the axle may accommodate itself to any unevenness of the ground over which the wheels, to be described, may travel, and the spindle is fixed against movement by the same being fixedly secured to the forward end of the tongue 7. Such securing means, comprises a bolt 12 passing up through the spindle 8 and the tongue 7, and a U bolt 13 is also provided, passing around the inner end of the spindle and up through the tongue. A bearing plate 14 is interposed between the spindle 8 and the lower face of the tongue, and the bolt 12, which is used for securing the spindle 8 in place is also used, see Fig. 5, for securing a bearing plate 15 to the upper forward face of the tongue 7; the bolt 12 also serves as a pivotal connection for a hinge 16 which projects forward of the end of the tongue 7 and has pivotally connected thereto at 17 a plate or strap 18 forming the other section of the hinge, which said plate is attached to a second tongue and has for its object a purpose to be explained.

The wheels of the truck are referred to as 19 and are mounted on short spindles 20 which are upturned as shown at 21 and pass through the bearing plates 6 of the brackets 5 and a cotter-pin 22 is employed to retain the connection between the brackets 5 and the spindles 20. To the spindles 20 are also connected brackets 23, which are to some extent similar to the brackets 5 having the bearing plates 24 through which the spindles 20 are carried and said bearing plates 24 lie in juxtaposition to and below and above the bearing plates 6 of the brackets 5, see Fig. 4. The brackets 23 at their lower ends are shown provided with the outwardly extending yoke portions 25 which are preferably semi-circular in form and when the wheels and spindles are connected up with the axle proper said semi-circular portions 25 will overlie and partially surround the inner hubs of the wheels 19 and portions of the spindles 20, see Fig. 3. It is through this connection of the brackets 23 with the spindles 20 and the overlying portions of said brackets 23 which partially surround the hubs of the wheels and spindles, that the spindles 20 are rotated in their bearings for swinging the wheels into a position, shown in dotted lines in Fig. 1. The connections for oscillating said brackets 23 and spindles 20 will now be described.

The second tongue to which reference has been made, which in reality is the front tongue or pole to which it is designed to attach the double and swingle trees, is indicated as 26 and to the lower face thereof and extending some distance along the same from its inner end is attached the forward section of the hinge between front and rear tongue sections, being the strap 18 referred to. This strap at a suitable point and for a short distance is bent downwardly and spaced apart from the tongue 26 as at 27 and is slotted, as shown at 28.

A truss frame composed of upper and lower bars 29 and 30, is spaced some distance in front of the axle and is normally in parallel relation with said axle. The upper bar 29 of this frame is spaced the farthest from the bar 30 beneath the tongue 26 and is connected to said bar 30 at or near this point by the studs 31, which not only secure the bars together but retain them separated, as shown, and a bolt 32 which connects said bars centrally beneath the tongue 26 is carried up through the slot 28 in the strap 18, see Fig. 5, and is capable of having a slidable relation with said strap, lengthwise of its slot, as is apparent. The bar 29 from a point where the studs 31 connect it with the bar 30, is preferably inclined downwardly toward the opposite ends of the bar 30, and at its outer ends is spaced a short distance from and is held in parallel spaced relation with the outer ends of the bar 30 by studs 33, and connections 34 pivotally secured by bolts or other means to and between the ends of the bars 29 and 30. The connections 34 are castings, or similar members which are provided with the channels or grooves 35 in their opposite faces in which are seated and secured by means of bolts 36, the outer ends of straps 37, which have their inner ends connected to the brackets 23, preferably in the manner seen in Figs. 2, 4 and 5.

A clevis 38 constructed somewhat as shown in Fig. 5 is provided in connection with the inner end of the tongue 26, with which the usual double tree connection may be made.

The tongue 26 when moved to the right, or to the left, as shown in dotted lines in Fig. 1 will be oscillated on the bolt 12 which serves as the pivot for said front tongue and with it will be oscillated the hinge formed of the sections 16 and 18; also, the truss frame formed of the bars 29 and 30, through the connection of the bolt 32 with the strap 18 will be moved endwise, and through the connection of the straps 37 between the ends of said truss frame and the brackets 23, cause said brackets to be oscillated and swing or turn the ground wheels 19, through the connection established between the brackets 23 and the spindles 20. The axle will accommodate itself to the unevenness of the ground by its oscillating in a vertical plane on the outer end of the spindle 8, which has such a bearing in the bearing block 4 as will allow for such oscillation, and the front tongue 26, may be raised or lowered to a considerable degree, through the pivotal connection provided between said front tongue 26 and the rear tongue 7, which is made in the hinge connection between the sections 16 and 18, described, when the bolt 32 will slide back and forth in the slot 28 of the strip 18 attached to the tongue 26, and the straps 37 move up or down on their connection with the brackets 23, see Fig. 2.

In Fig. 7 a modified construction of truck is shown, composed, preferably, of a pair of parallel spaced bars 39 which may be of any suitable length, the opposite ends of which are joined in brackets or other suitable connections 40, which form a bearing for short vertical stems provided with laterally extended spindles 41 on which may be suitably secured the ground wheels.

To the axle, just described, is connected the forward end of a tongue 42 adapted to have connection with an implement. The connection of the tongue 42 with the axle is made through a bracket 43 which has ears 44, between which the axle is pivotally secured to allow for vertical oscillation of said axle, and said bracket has the further ears 45 between which the forward end of the tongue 42 is disposed. A block 46 is preferably secured between the bars 39 of the axle to provide a filler for that portion of the axle where the bracket 43 is connected thereto.

Pivotally mounted on the forward end of the tongue 42, by means of a suitable coupling, not shown, is a plate 47 which preferably projects beyond the end of the tongue 42 and from the opposite ends of said plate extend upwardly a pair of spaced ears 48 and 49. To the former, is preferably connected, the front tongue 50, which makes provision for a drop tongue in connection with the truck, and the rear end of the tongue 50 is designed, when the front end thereof is raised, to drop down in between the ears 49, which will serve to relieve the strain on the pivotal connection of the tongue 50 with the ears 48, when said tongue, together with the plate 47, are swung on the coupling between the plate and tongue 42, when it is designed to steer the wheels or operate the steering connections between the plate 47 and said wheels.

The steering connections comprise a pair of short cranks 51 which have a suitable connection with the upper ends of the spindle 41, and to the outer ends of said cranks 51 are connected the opposite ends of a bar 52 which has a suitable connection with the forward end of the plate 47. From the foregoing, it will be seen that upon the swinging of the tongue 50, the plate 47 will be correspondingly swung and impart motion to the bar 52, which will rotate the spindles 41 in their bearings and turn the wheels in the direction in which it is designed to move the tongue truck.

I have made mention that the tongue 7 might be connected with a disk-harrow or other implement in some other way than that illustrated, having in mind the fact that with some implements the hitch might be lower, while with others, the hitch might be higher; however, it is preferred to provide for such a contingency by connecting the bars 1 and 2 of the axle, adjustably with the brackets 5, as seen in Fig. 8.

The brackets 5 are provided with a plurality of perforations 53 spaced equidistant from each other, and each of said perforations 53 in the brackets, when the brackets and axles are in the relative positions seen in Fig. 3, coincides with a perforation 54, in the portions 3 of the bar 1, the lowest perforations 54 in said portions 3 of the bar 1 always coinciding with a perforation 55 in the downwardly bent portions of the bar 2, and bolts 56, secure the brackets 5 to the bar 1 and the bar 1 to the bar 2.

Fig. 8 illustrates that the axle and tongue connections have been dropped or lowered the distance between two of the perforations 53 in the brackets 5, and gives a very clear idea of the manner in which adjustment may be made for the purpose of varying the height of the hitch of the tongue 7 to meet the requirements in connection with various makes and styles of agricultural tools and implements. While the ends of the main portion of the axle are shown provided with only three openings or perforations 54 corresponding to the number shown in the brackets 5, it is understood that the extensions 3 of the ends of the axle may be made of any suitable length and thus enlarge the scope of the up or down adjustment of the axle and tongue 7, for the purposes explained.

Having thus fully described my invention what I claim and desire to secure by Letters Patent of the United States, is:—

1. A truck attachment for an implement having a fixed and rigid tongue, consisting of an axle, means for attaching said axle to the implement tongue, so that said axle may oscillate in a vertical plane, but not in a horizontal plane, wheels connected with the opposite ends of said axle, a member to which is secured a steering tongue, a plate pivotally connected with said member, whereby said member may oscillate in a vertical plane, said plate pivotally connected with the implement tongue so as to oscillate in a horizontal plane, and steering connections between said member and said wheels.

2. A truck attachment for an implement having a fixed and rigid tongue, consisting of an axle, a spindle secured to said tongue, on which said axle may be carried to oscillate in a vertical plane, wheel spindles having a swiveled connection with the opposite ends of said axle, a member to which is secured a steering tongue, a plate pivotally connected with said member, whereby said member may oscillate in a vertical plane, said plate pivotally connected to the implement tongue so as to oscillate in a horizontal plane, and means for forming a steering connection between said member and said wheel spindles.

3. A truck attachment for an implement having a fixed and rigid tongue, consisting of an axle, a spindle secured to and projecting forwardly from the underside of said tongue, to form a connection for said axle with said tongue, wheel spindles having a swiveled connection with the opposite ends of said axle, a member to which is attached on the upper side thereof a steering tongue, a plate pivotally attached to said member so as to allow said member to oscillate in a vertical plane, means for pivotally attaching said plate to said rigid tongue, so as to allow said plate and member to oscillate in a horizontal plane, and means for forming a steering connection between said member and said wheel spindles.

4. A truck for agricultural implements, comprising a front and rear tongue, connections between said tongues, said connections being such that the front tongue may be swung from side to side and up or down, an axle having connection with said rear tongue, whereby said axle may accommodate itself to the unevenness of the ground, wheels having a swiveled connection with said axle, a frame slidably connected with the front axle, and steering connections between said frame and said wheels.

5. A truck for agricultural implements, comprising an axle, wheels having a swiveled connection with the opposite ends of said axle, a tongue having a pivotal connection with said axle, a frame connected to and slidable longitudinally of said tongue when said tongue is raised or lowered, and means connected to said frame and in operative connection with said wheels for steering said wheels when said tongue is swung to the right or to the left.

6. A truck for agricultural implements, comprising a rear tongue, an axle connected with said tongue, said axle composed of upper and lower bars connected at their opposite ends, brackets secured to the opposite ends of said axle, wheel spindles swingably connected with said brackets, oscillatory members supported on said brackets and having portions overlying and partially surrounding said spindles, a front tongue pivotally connected with said rear tongue, a truss frame slidably connected with said front tongue and normally in parallel spaced relation with said axle, and straps connected with the opposite ends of said truss frame and said oscillatory members.

7. A truck for agricultural implements, comprising a tongue attached to the implement, an axle connected with said tongue and fixed against horizontal oscillation, wheels having a swiveled connection with the opposite end of said axle, a plate pivotally connected with said tongue and projecting forwardly thereof, a steering tongue, a strap attached to said steering tongue, and pivotally connected to the plate of said first mentioned tongue, and steering connections between said strap and said wheels.

In testimony whereof I affix my signature, in presence of two witnesses.

SAMUEL B. HAZARD.

Witnesses:
CHAS. W. LA PORTE,
LAURA E. CLAYPOOL.